United States Patent [19]

Smith et al.

[11] 4,143,581
[45] Mar. 13, 1979

[54] ANCHORING RETAINER FOR THREADED FASTENERS

[75] Inventors: Jon D. Smith, Fenton; Glenn T. Parker, Ortonville, both of Mich.

[73] Assignee: Dry Dock Industries, Inc., Fenton, Mich.

[21] Appl. No.: 803,806

[22] Filed: Jun. 6, 1977

[51] Int. Cl.² ............................................. F16B 35/04
[52] U.S. Cl. .......................................... 85/80; 85/3 S
[58] Field of Search .................. 85/70, 71, 80–85, 85/1 H, 3 R, 3 K, 3 S

[56] References Cited

U.S. PATENT DOCUMENTS

| 1,819,828 | 8/1931 | Tomkinson | 85/3 S |
| 2,148,977 | 2/1939 | Buck | 85/71 |
| 2,897,694 | 8/1959 | Carney | 85/3 S X |
| 3,213,746 | 10/1965 | Dwyer | 85/3 R X |

Primary Examiner—Rodney H. Bonck
Attorney, Agent, or Firm—Cullen, Sloman, Cantor, Grauer, Scott & Rutherford

[57] ABSTRACT

An anchoring retainer is provided for mounting at one side of a supporting structure such as a wall, ceiling or the like having an opening therein. The retainer is used with a threaded element or fastener which extends from the other side of the supporting structure through the opening into the retainer and together forms a fastener assembly. The retainer comprises a flexible unitary one-piece plastic body having an axis which is adapted to extend through the opening in the supporting structure. The body has a generally triangular configuration and is provided with a sleeve at the apex of the triangle. An opening is provided in the sleeve surrounding the axis. The sleeve at the edges thereof located on opposite sides of the axis is provided with a pair of integrally formed outwardly diverging flexible legs. A flexible control strut is spaced axially from the sleeve and has the ends thereof integrally connected to the outer end portions of the flexible legs. The control strut has a central aperture axially aligned with and spaced from the sleeve opening and through which the threaded element is adapted to extend. The control strut is moved away from the sleeve and towards the supporting structure to extend or expand the outer ends of the flexible legs to firmly grip the structure upon the threading of the threaded element or fastener into the opening in the sleeve.

11 Claims, 7 Drawing Figures

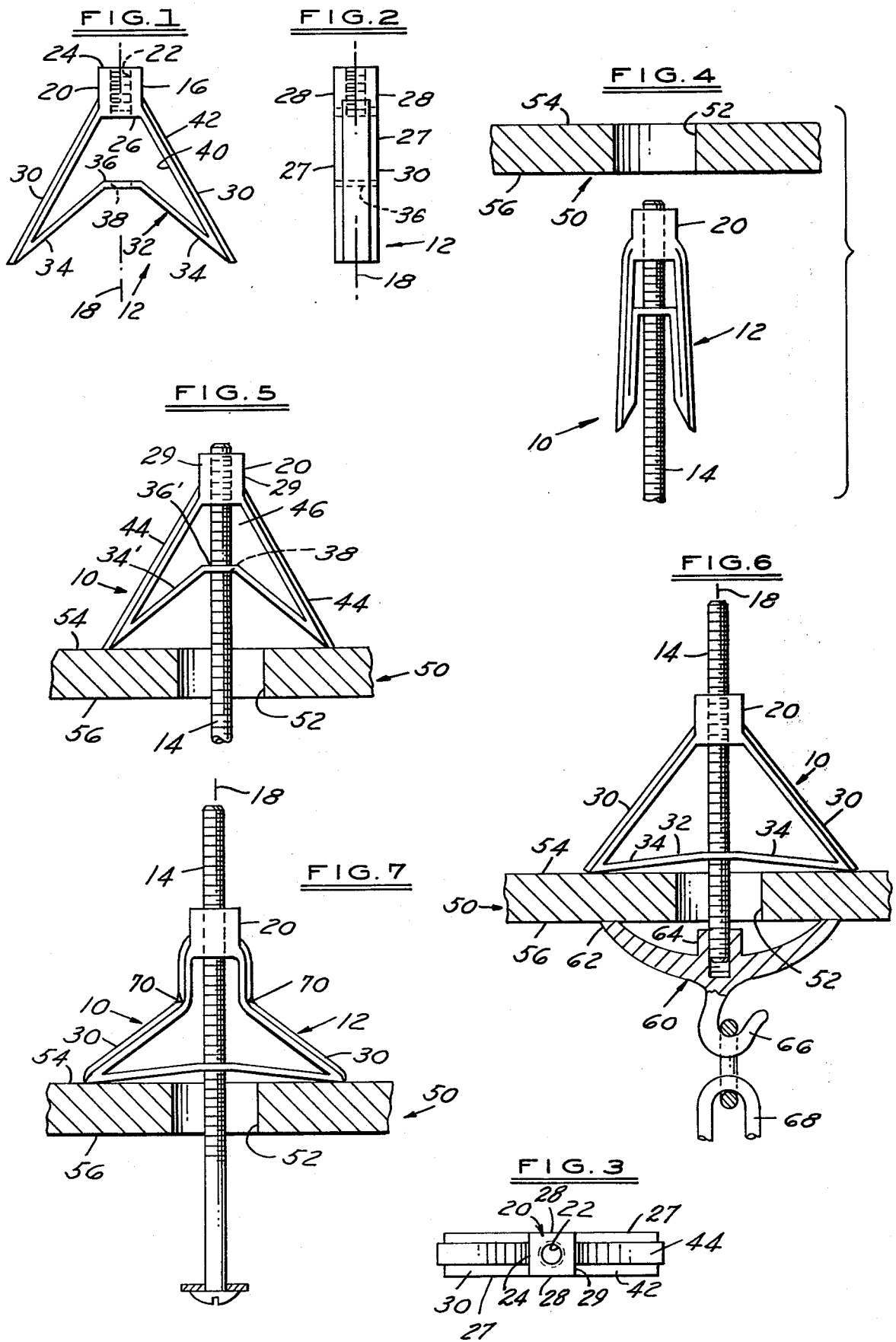

ANCHORING RETAINER FOR THREADED FASTENERS

BACKGROUND OF THE INVENTION

1. Field of the Invention

This invention relates to expandable or flexible retainers and fastener assemblies, particularly for use in providing a support on a hollow or solid wall, ceiling or other supporting structure by which various objects may be suspended or attached to the supporting structure. It is common practice to use a "molly bolt".

2. Description of the Prior Art

Retainers or fastener assemblies of the type disclosed herein have been known for a long time in a great variety of embodiments for wall panels, ceilings and other supporting structures, including retainers and fastener assemblies having an expansible portion which by its expansion after mounting, abuts the rear surface of the supporting structure.

While some of the prior art devices have certain features which are common to the present invention, none of them appear to have the material, design and installation advantages of the present invention which will be subsequently described.

SUMMARY OF THE INVENTION

It is a feature of the present invention to provide a fastener assembly comprising a retainer and a threaded fastener carried thereby in which the retainer comprises a unitary one-piece body made from a flexible material and having an A-shape or triangular configuration prior to use and after the retainer body has been inserted through a restrictive hole in the supporting structure. The body is initially collapsed around the threaded fastener to assume a clothes pin configuration and the collapsed fastener assembly is thereafter inserted through the restrictive hole of the supporting structure. The retainer of the assembly due to the flexibility of the material expands to its initial shape after insertion through the restrictive hole. Upon a force being applied to the threaded fastener in a direction away from the support, the legs of the retainer grip the support. The threading of the threaded fastener into the retainer while at the same time maintaining said force is effective to expand the legs of the retainer to increase the area of the legs in frictional contact with the supporting structure thus increasing the tensile strength of the fastener assembly.

Another feature of the present invention is to provide a retainer of the aforementioned type which is made from a plastic material having certain advantages over prior art devices including fabricating the retaining in a unitary body, is light weight, noncorrosive, non-conductive and dampens vibrations when in use.

A further feature of the present invention is to provide a flexible retainer of the aforementioned type which permits its end use as an anchor, clamp, cushion, hanger, leg, puller, or shock absorber.

A still further feature of the present invention is to provide a retainer of the aforementioned type which due to the flexibility thereof, may be contoured to fit varied surfaces which are flat, concave, convex, irregular, compound, circular or to surfaces which form acute or obtuse angles.

Another feature of the present invention is to provide a retainer of the aforementioned type wherein the body has a sleeve at the apex of the triangular configuration which is provided with a centrally located opening for the threaded fastener and with the sleeve being provided with a pair of integrally formed outwardly diverging flexible legs. With such a construction, a flexible control strut is spaced from the sleeve and has the ends thereof integrally connected to the outer ends of the flexible legs to control the surface area of the flexible legs in contact with the support surface to effectively distribute the load. With such a construction, the greater the load applied to the retainer, the more surface areas of the legs are in contact with the support surface to distribute the load. This is accomplished without any increase in the diameter of the restrictive hole in the supporting structure which normally is one half inch diameter or smaller for most household and electrical fastening applications.

Still another feature of the present invention is to provide a retainer of the aforementioned type where the size of same may be varied for use in various strength applications.

A further feature of the present invention is to provide a resilient retainer of the aforementioned type wherein, upon excessive loads applied thereto, may be engineered to collapse before damage occurs to the mounting or supporting structure.

A still further feature of the present invention is to provide a fastener assembly of the aforementioned type which, due to the flexibility of the retainer and to the frictional contact between the legs of the retainer and the supporting structure, can be used with light sheet metal or other thin materials forming the supporting structure without damaging or distorting such structure.

The fastener assembly of the present invention, when installed on a supporting structure, can support swinging loads and withstand shock or lateral impact forces on the supported load without any damage to the supporting surface. During installation, the collapsed fastener assembly does not chip or enlarge the restrictive hole in the supporting structure. Once installed and in use at maximum load, the threaded fastener is not normally damaged.

Finally it is a feature of the present invention to provide a resilient retainer and a fastener assembly which are simple in construction; contain relatively fewer parts than prior art devices; are easy to manufacture; are efficient in operation; and are economical to maintain.

BRIEF DESCRIPTION OF THE DRAWINGS

FIG. 1 is a front elevation of the flexible retainer;

FIG. 2 is a side elevation of the retainer;

FIG. 3 is a top view of the retainer;

FIG. 4 is a front elevation of the fastener assembly, with the flexible retainer in a collapsed position around the threaded fastener, and ready for installation on a supporting structure;

FIG. 5 is a front elevation of the fastener assembly mounted on the supporting structure immediately after installation;

FIG. 6 is a front elevation of the mounted fastener assembly, with the legs expanded and associated with a hook for supporting a load from the supporting structure; and FIG. 7 is a front elevation of the mounted fastener assembly after the threaded fastener has been rotated to expand the legs of the retainer and to collapse part of the retainer.

DETAILED DESCRIPTION OF A PREFERRED EMBODIMENT

The fastener assembly 10 comprises only two components including a flexible retainer 12 of unitary construction and a threaded fastener or element 14. The retainer 12 is formed by a molding or casting operation from a resilient or flexible material such as nylon or a plastic material such as polypropylene of the high impact type. The threaded fastener 14 is commercially available and may take different forms such as a threaded bolt as in FIG. 7 or a threaded element secured to a hook as in FIG. 6.

The retainer 12, shown in full size in the drawings, has a one-piece unitary body 16 of generally A-shape or triangular configuration (FIG. 1). The body 16 is of substantially equal or uniform width from top to bottom as shown in FIG. 2 and is symmetrical about axis 18. The body 16 has a pair of parallel sides or surfaces 27 extending from the top to the bottom thereof. The body 16 between sides 27 is of substantially uniform width between the top and bottom as shown in FIG. 2. Body 16 has a sleeve 20 of generally rectangular cross-section at the apex of the triangular configuration as shown in FIG. 1 with axis 18 extending through the center of the sleeve 20. A non-threaded opening 22 concentric with axis 18 extends through the sleeve 20 from the top flat surface 24 to the bottom flat surface 26.

The sleeve 20 has a first pair of parallel edge surfaces 28 forming part of the parallel sides 27 of the body 16. The sleeve 20 has a second pair of parallel edge surfaces 29 (FIG. 3) located on opposite sides of the axis 18 which are provided with a pair of integrally formed outwardly diverging flexible legs 30. The legs 30 are of substantially uniform width and have side surfaces forming part of the parallel sides 27 of the body 16. A flexible control strut, spreader or leg 32 is axially spaced from the sleeve 20 and the outer ends thereof integrally connected to the outer ends or end portions of the flexible legs 30. The strut 30 is of substantially uniform width and has side surfaces forming part of the parallel sides 27 of the body 16. The strut 32 includes a pair of extendable side portions 34 located on opposite sides of a center portion 36. The center portion 36 has a centrally located non-threaded aperture 38 surrounding the axis 18. The aperture 38 has a diameter larger than the diameter of opening 22. The side portions 34 of the control strut 32 diverge downwardly and away from the center portion 36 as shown in FIG. 1 prior to use. The side portions 34 can bend about the edges of the center section 36 as shown in FIGS. 4, 6 and 7.

The legs 30 have an inner surface 40 and an outer surface 42 having an elongated raised rib 44 for stiffening purposes. The ribs extend from sleeve 20 to the feet or bottom edges of the legs.

The inner surfaces 40 of the legs 30 and the inner surfaces 34' and 36' provided on side portions 34 and center portion 36 respectively surround an opening 46 which extends completely through the body 16. The side portions 34 are generally of uniform thickness. The side portions 34 where they join the legs 30 define the ends or end portions of the legs which are adapted to frictionally contact the supporting structure without damage thereto. The end portion of each leg 30 is thicker than the remaining portion thereof as shown in FIG. 1. When the control strut 32 is moved away from the sleeve 20 by the threaded fastener 14 as will be subsequently explained, the size of opening 46 generally increases as shown in FIG. 6 resulting in more surface areas of the ends of legs 30 frictionally contacting the support structure.

After manufacture the retainer 12 has the size and configuration shown in FIGS. 1-3 inclusive. Thereafter, the threaded element 14 is inserted through the opening 38 in the center section 36 of strut 32. Clearance is provided between the threaded element 14 and the non-threaded opening 38. The leading end of the element 14 threads the non-threaded opening 22 in sleeve 20. In some constructions it may be desirable to form threads in the opening 22 of sleeve 20 at the time the body 16 is manufactured.

The support structure 50 may be a ceiling, wall, panel or the like from which an object is to be attached or suspended. The support structure 50 is provided with a restrictive opening 52 of circular configuration normally of a one half inch diameter or less. The structure 50 has a support surface 54 normally hidden from view and a front surface 56. The support surface 54 may be flat as illustrated or the surface may be concave, convex, irregular, compound or circular. Also the fastener assembly 10 may be used with a pair of intersecting surfaces having an acute angle or an obtuse angle therebetween.

In installing the fastener assembly 10, the flexible legs 30 are collapsed or folded to the clothespin configuration of FIG. 4 and thereafter the collapsed assembly 10 is inserted through the opening 52 in the support structure 50. Once the collapsed retainer 12 on assembly 10 emerges from hole 52, it expands, with the retainer 12 assuming the position shown in FIG. 5.

Thereafter a force is applied to the threaded element 14 to maintain frictional contact between the end portions of the legs 30 and the supporting surface 54 while at the same time the element 14 is rotated in a direction to thread same into the sleeve 20. As a result thereof the contact strut 32 moves away from sleeve 20 as shown in FIG. 6 effective to expand the legs 30 moving them away from axis 18. Thus more surface area of the end portions of legs 30 contact support surface 54 thereby permitting the carrying of a larger load. In FIG. 6, a fixture 60 having an annular rim 62, a centrally located threaded nut 64 and a hook 66 is provided. The threaded element 14 is threaded into the nut 64 with the annular rim 62 in contact with the normally exposed surface 56. A load, not shown, may be connected by a chain 68 to the hook 66.

The leg 30 of retainer 12 may be provided with a fracture zone or cut 70 as shown in FIG. 7 which permits the top portions of legs 30 to collapse around the threaded element 14 upon the threading of element into sleeve 20 and the expansion of the legs 30 to firmly frictionally grip the surface 54. Such a structure adds strength to the triangular configuration. In some designs, the fracture of the legs 30 and the collapse thereof may be used as a safety signal to indicate that the load of the fastener assembly 10 has been exceeded and that possible damage to the surface 54 may result.

The use of a plastic or flexible retainer 12 has many advantages as noted herein. It can be fabricated in one piece; is economical; and the equipment for making same may be maintained economically. The retainer 12 is light weight due to the provision of the opening 46 and to the overall size and configuration of same. The plastic retainer is non-corrosive, non-conductive and will dampen vibrations when in use. The expansion of the legs 30 provides for additional surface areas of the legs to contact the support surface 54 and to distribute the load. The retainer 12 when loaded within the working limits of the assembly 10 does not damage or distort the supporting surface 54.

What is claimed is:

1. A retainer for mounting at one side of a supporting structure having an opening therein, said retainer being adapted to be used with a threaded element which extends from the other side of the supporting structure through the opening into the retainer, said retainer comprising a flexible unitary one-piece body made from a plastic material, said body being symmetrical about a centrally located axis which is adapted to extend through the opening in the supporting structure, said body having a top, a bottom and a pair of sides, said body between said sides being of substantially uniform width between said top and said bottom, said body being of generally triangular configuration when viewed from either one of the sides thereof, said body having a sleeve provided with a sleeve opening surrounding said axis at the apex of the triangular configuration, which corresponds to the top of said body, said sleeve having a first pair of parallel edge surfaces forming part of the parallel sides of said body, and a second pair of parallel edge surfaces perpencidular to said first pair of parallel edge surfaces and located on opposite sides of said axis, said second pair of edge surfaces being provided with a pair of integrally formed outwardly diverging flexible legs, said legs having side surfaces forming part of the parallel sides of said body, and a flexible control strut spaced axially from said sleeve and having the ends thereof integrally connected to the outer ends of said outwardly diverging flexible legs for limiting the spread of said legs, said control strut having side surfaces forming part of the parallel sides of said body, said control strut having a central aperture axially aligned with and spaced from said sleeve opening and through which the threaded element is adapted to extend, said control strut being adapted to move away from said sleeve and towards the supporting structure to flex said outwardly diverging flexible legs upon the threading of the threaded element into the opening in said sleeve.

2. The retainer defined in claim 1 wherein said central aperture is non-threaded.

3. The retainer defined in claim 1 wherein said sleeve opening is non-threaded prior to the insertion of the threaded element.

4. The retainer defined in claim 1 wherein said sleeve opening is threaded.

5. The retainer defined in claim 1 wherein said plastic material is polypropylene.

6. The retainer defined in claim 1 wherein said plastic material is nylon.

7. A fastener assembly comprising in combination a retainer for mounting at one side of a supporting structure having an opening therein and a threaded element which is adapted to extend from the other side of the supporting structure through the opening into the retainer, said retainer comprising a flexible unitary one-piece body made from a plastic material, said body being symmetrical about a centrally located axis which is adapted to extend through the opening in the supporting structure, said body having a top, a bottom and a pair of sides, said body between said sides eing of substantially uniform width between said top and said bottom, said body being of generally triangular configuration when viewed from either one of the sides thereof, said body having a sleeve provided with a sleeve opening surrounding said axis at the apex of the triangular configuration, which corresponds to the top of said body, said sleeve having a first pair of parallel edge surfaces forming part of the parallel sides of said body, and a second pair of parallel edge surfaces perpendicular to said first pair of parallel edge surfaces and located on opposite sides of said axis, said second pair of edge surfaces being provided with a pair of integrally formed outwardly diverging flexible legs, said legs having side surfaces forming part of the parallel sides of said body, and a flexible control strut spaced axially from said sleeve and having the ends thereof integrally connected to the outer ends of said outwardly diverging flexible legs for limiting the spread of said legs, said control strut having side surfaces forming part of the parallel sides of said body, said control strut having a central aperture axially aligned with and spaced from said sleeve opening, said threaded element extending along said axis through said central aperture with clearance therebetween into threaded engagement with the opening in said sleeve, said control strut being moved away from said sleeve and adapted to be moved towards the supporting structure to extend the outer ends of said outwardly diverging flexible legs away from said axis upon the threading of said threaded element into the opening in said sleeve.

8. The fastener assembly defined in claim 7 wherein said central aperture has a larger diameter than the diameter of said sleeve opening.

9. The fastener assembly defined in claim 7 wherein said plastic material is polypropylene.

10. The fastener assembly defined in claim 7 wherein said plastic material is nylon.

11. The fastener assembly defined in claim 7 wherein said body may be reduced to a size smaller than the opening in the supporting structure to permit it to be inserted through such opening for support at said one side of the supporting structure.

* * * * *